United States Patent
Dally

(10) Patent No.: US 9,231,477 B2
(45) Date of Patent: Jan. 5, 2016

(54) CONTROL OF A SOFT-SWITCHED VARIABLE FREQUENCY BUCK REGULATOR

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 241 days.

(21) Appl. No.: 13/868,969

(22) Filed: Apr. 23, 2013

(65) Prior Publication Data

US 2014/0312860 A1 Oct. 23, 2014

(51) Int. Cl.
*G05F 1/00* (2006.01)
*H02M 3/158* (2006.01)

(52) U.S. Cl.
CPC .......... *H02M 3/1588* (2013.01); *H02M 3/1584* (2013.01); *Y02B 70/1466* (2013.01)

(58) Field of Classification Search
CPC ... H02M 3/156; H02M 3/157; H02M 3/1588; H02M 3/1584
USPC .......... 323/282, 283, 284, 268, 271, 272, 285
See application file for complete search history.

(56) References Cited

U.S. PATENT DOCUMENTS

| | | | |
|---|---|---|---|
| 3,660,753 A | 5/1972 | Judd et al. | |
| 5,889,392 A | 3/1999 | Moore et al. | |
| 6,614,208 B2 * | 9/2003 | Narita | 323/283 |
| 7,235,955 B2 * | 6/2007 | Solie et al. | 323/222 |
| 7,479,772 B2 | 1/2009 | Zane et al. | |
| 7,495,423 B1 | 2/2009 | Knight et al. | |
| 7,779,281 B1 * | 8/2010 | Brumett et al. | 713/322 |
| 8,237,421 B1 * | 8/2012 | Shahani | 323/282 |
| 8,278,895 B2 | 10/2012 | Gardner et al. | |
| 8,482,271 B2 | 7/2013 | Prodic et al. | |
| 2004/0027105 A1 | 2/2004 | Nakamura et al. | |
| 2004/0130307 A1 * | 7/2004 | Dequina et al. | 323/282 |
| 2006/0038545 A1 * | 2/2006 | Rutter | 323/283 |
| 2007/0236197 A1 | 10/2007 | Vo | |
| 2007/0290667 A1 | 12/2007 | Nagai et al. | |
| 2008/0012540 A1 * | 1/2008 | Chen | 323/224 |
| 2008/0024103 A1 | 1/2008 | Komiya | |

(Continued)

OTHER PUBLICATIONS

Billings et al., "Switchmode Power Supply: Handbook," McGraw Hill, Third Edition, 2011, pp. 1.145-1.150; pp. 2.163-2.176; pp. 3.119-3.155.

(Continued)

*Primary Examiner* — Adolf Berhane
*Assistant Examiner* — Alex Torres-Rivera
(74) *Attorney, Agent, or Firm* — Zilka-Kotab, PC

(57) ABSTRACT

A system and method are provided for controlling a soft-switched modified buck regulator circuit. A voltage ($V_x$) across or a current through a pull-down switching mechanism within the modified buck regulator circuit is sensed when the pull-down switching mechanism is enabled, where the pull-down switching mechanism is coupled to an upstream end of an inductor and is coupled in parallel with a capacitor. A target time when the pull-down switching mechanism will be disabled ($t_{tf}$) is computed and the pull-down transistor is disabled at the computed target time.

20 Claims, 9 Drawing Sheets

(56) References Cited

U.S. PATENT DOCUMENTS

| | | |
|---|---|---|
| 2008/0238390 A1 | 10/2008 | Trivedi et al. |
| 2008/0284401 A1 | 11/2008 | Oettinger et al. |
| 2010/0244799 A1 | 9/2010 | Moussaoui |
| 2011/0018512 A1 | 1/2011 | Horii |
| 2011/0043172 A1 | 2/2011 | Dearn |
| 2011/0089915 A1 | 4/2011 | Qiu et al. |
| 2011/0241640 A1 | 10/2011 | Qiu et al. |
| 2011/0291632 A1 | 12/2011 | Yu et al. |
| 2011/0316502 A1 | 12/2011 | Tang et al. |
| 2012/0007577 A1 | 1/2012 | Lee |
| 2012/0056604 A1 | 3/2012 | Song et al. |
| 2012/0068679 A1 | 3/2012 | Klein et al. |
| 2012/0081095 A1 | 4/2012 | Kung |
| 2012/0086418 A1 | 4/2012 | Lee et al. |
| 2012/0119718 A1 | 5/2012 | Song |
| 2012/0119719 A1 | 5/2012 | Teh |
| 2012/0169314 A1 | 7/2012 | Tong et al. |
| 2012/0176104 A1* | 7/2012 | Chen et al. .................... 323/235 |
| 2012/0242313 A1 | 9/2012 | Ko et al. |
| 2012/0297104 A1 | 11/2012 | Thottuvelil et al. |
| 2013/0069611 A1 | 3/2013 | Menegoli et al. |
| 2013/0147451 A1 | 6/2013 | Hagan |
| 2014/0097813 A1 | 4/2014 | Dally |
| 2014/0312868 A1 | 10/2014 | Dally |

OTHER PUBLICATIONS

Infineon, "High Current PN Half Bridge NovalithIC," Automotive Power, BTN7930 Data Sheet, Rev. 1.1, Nov. 2007, pp. 1-28.

Redl et al., "Ripple-Based Control of Switching Regulators—An Overview," IEEE Transaction on Power Electronics, vol. 24, No. 12, Dec. 2009, pp. 2669-2680.

Yousefzadeh et al., "Proximate Time-Optimal Digital Control for Synchronous Buck DC-DC Converters," EEE Transaction on Power Electronics, vol. 23, No. 4, Jul. 2008, pp. 2018-2026.

Hua, G. et al., "Soft-Switching Techniques in PWM Converters," IEEE Transactions on Industrial Electronics, vol. 42, No. 6, Dec. 1995, pp. 595-603.

Zhou, S. et al., "High Efficiency, Soft Switching DC-DC Converter With Adaptive Current-Ripple Control for Portable Applications," IEEE Transactions on Circuits and Sytems—II: Express Briefs, vol. 53, No. 4, Apr. 2006, pp. 319-323.

Non-Final Office Action from U.S. Appl. No. 13/868,975, dated Dec. 31, 2014.

Final Office Action from U.S. Appl. No. 13/868,975, dated Jun. 3, 2015.

Non-Final Office Action from U.S. Appl. No. 13/868,975, dated Sep. 16, 2015.

* cited by examiner

CONTROL OF A SOFT-SWITCHED VARIABLE FREQUENCY BUCK REGULATOR

FIELD OF THE INVENTION

The present invention relates to regulator circuits, and more specifically to buck regulator circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional switching regulator is an electric power conversion device that interfaces between a power supply and a device, providing current to the device and responding to changes in current demands to maintain a supply voltage level.

Conventional voltage regulators used for central processing units (CPUs) and graphics processing units (GPUs) convert 12 Volts to approximately 1 Volt using an interleaved multi-phase "buck" converter. The switches for each phase of the buck converter are typically controlled with a fixed-frequency pulse-width-modulation (PWM) signal and the buck converter is operated in continuous-conduction mode (CCM). That is, the current that is generated in an inductor is continuous and unidirectional. While a conventional buck converter is simple to operate and requires only a few components (i.e., two switches, a filter capacitor, and an inductor), significant switching losses are incurred each time a switch coupled between the power supply and the inductor is turned on to pull the upstream side of the inductor from approximately 0V to approximately 12V.

Thus, there is a need for improving regulation of voltage levels and/or other issues associated with the prior art.

SUMMARY

A system and method are provided for controlling a soft-switched modified buck regulator circuit. A voltage ($V_x$) across or a current through a pull-down switching mechanism within the modified buck regulator circuit is sensed when the pull-down switching mechanism is enabled, where the pull-down switching mechanism is coupled to an upstream end of an inductor and is coupled in parallel with a capacitor. A target time when the pull-down switching mechanism will be disabled ($t_{tf}$) is computed and the pull-down transistor is disabled at the computed target time.

DETAILED DESCRIPTION

A conventional buck converter is operated to generate a unidirectional and continuous current through the inductor using "hard-switching" to enable and disable the switches coupled to the upstream side of the inductor. As previously explained, hard-switching of a pull-up switch coupled between the power supply and the inductor incurs significant switching losses when the pull-up switch is turned on to pull the upstream side of the inductor from approximately 0V to approximately 12V. Similarly, hard-switching of a pull-down switch coupled between the inductor and ground incurs significant switching losses when the pull-down switch is turned on to pull the upstream side of the inductor from approximately 12V to approximately 0V. In contrast, "soft-switching" a modified buck regulator reduces the switching losses, as described further herein.

Figure 1A:
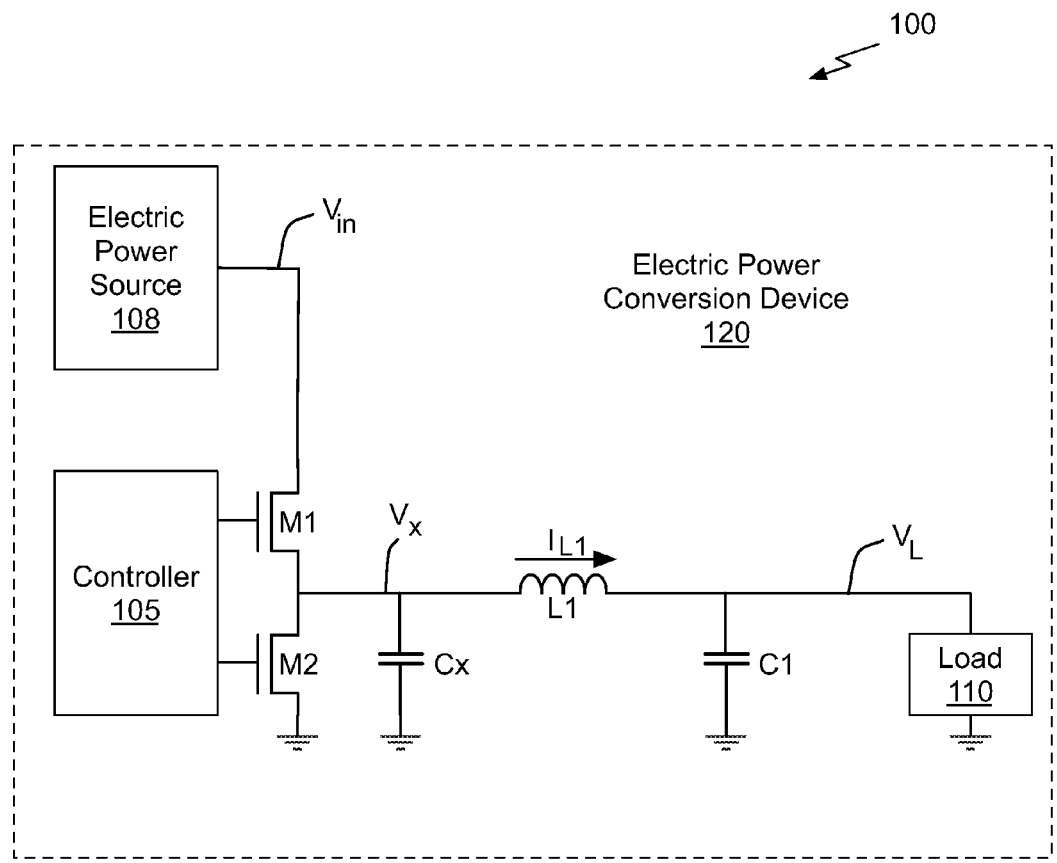
FIG. 1A illustrates a electric power conversion system including an electric power conversion device that is implemented as a soft-switched buck regulator, in accordance with one embodiment.

FIG. 1A illustrates an electric power conversion system 100 including an electric power conversion device 120 that is implemented as a soft-switching buck regulator, in accordance with one embodiment. The electric power conversion device 120 may be one phase of a multi-phase switching regulator, as shown in FIG. 1C. The electric power conversion device 120 is configured to provide a desired output voltage level ($V_L$) at the load 110 by converting power received from an electric power source 108. The configuration of the electric power source 108, the controller 105, the switching devices M1 and M2, and the inductor L1 shown in FIG. 1A is typically referred to as a "buck" regulator (or converter).

The electric power conversion device 120 includes a current control mechanism. The current control mechanism is coupled to the electric power source 108 and a controller 105 and is operable to control the current $I_{L1}$ flowing through the inductor L1. The arrow indicates the flow of current $I_{L1}$ in the positive direction from an upstream end of the inductor L1 to a downstream end of the inductor L1. For example, as illustrated, the current control mechanism may include one or more first switching mechanisms M1 and one or more second switching mechanisms M2. The switching mechanisms M1 and M2 may each include, for example, N-type power MOSFETs (metal oxide semiconductor field-effect transistor), and/or other switching mechanisms. In one embodiment, the switching mechanism M1 is a P-type power MOSFET.

Although single switching mechanisms M1 and M2 are illustrated for the ease of understanding, it will be appreciated that a plurality of switching mechanisms M1 and M2 may be connected in parallel to increase current capacity, decrease conduction losses, and the like.

The controller 105 is configured to apply one or more control signals to the switching mechanisms M1 and M2. For example, the controller 105 may be configured to generate pulse width modulation (PWM) signals or pulse frequency modulation (PFM) signals, a combination of PWM and PFM, and/or different control signals to selectively enable the switching mechanisms M1 and M2 according to a duty factor. In one embodiment, the controller 105 is configured to generate control signals to selectively enable the switching mechanisms M1 and M2 to perform soft-switching. Regardless of the specific configuration, the controller 105 is configured to provide control signals such that the switching mechanisms M1 and M2 are not concurrently enabled (i.e., turned on). In other words, only one of switching mechanism M1 and M2 is enabled at a time. Enabling switching mechanisms M1 and M2 concurrently provides a direct path between the supply of electric power source 108 and ground, thereby potentially damaging the electric power conversion device 120 and/or the load 110 and/or resulting in undesirable high power usage.

The electric power conversion device 120 includes a modified buck regulator that comprises the current control mechanism (i.e., switching mechanisms M1 and M2), the inductor L1, and a small capacitor Cx. The small capacitor Cx is not included in a conventional buck regulator. The capacitor Cx slows the rise of the voltage Vx at the upstream end of L1 when switching mechanism M2 turns off, allowing the switching mechanism M2 to turn off in ZVS (zero-voltage switching) mode. A ZVS mode can be performed when the voltage across the switching mechanism M2 is approximately zero, meaning that the voltage at Vx is approximately at ground (e.g., 0V). The controller 105 may be configured to operate the current control mechanism so that each operating cycle during which the capacitor C1 is charged by $I_{L1}$ ends with $I_{L1}$ going slightly negative. When $I_{L1}$ goes negative, $I_{L1}$ flows to the upstream side of L1, driving node Vx high. Vx is pulled up and the switching mechanism M1 turns on in ZVS when Vx is approximately equal to $V_{in}$, i.e., the voltage at the electric power source 108 (e.g., 12V). The switching mechanism M1 may turn on in ZCS (zero-current switching) mode because $I_{L1}$ should be near zero when Vx reaches $V_{in}$.

Soft-switching is performed by the controller 105 when the switching mechanisms M1 and M2 are turned on and/or off in a ZVS mode. The capacitor Cx slows the rise of the Vx when switching mechanism M2 turns off and also slows the fall of Vx when switching mechanism M1 turns off, allowing the switching mechanisms M1 and M2 to turn off in ZVS mode. Variable frequency operation is implemented by the controller 105 to perform the soft-switching. In a conventional implementation of a buck converter a 1 uH inductor may be used. In the modified buck regulator shown in FIG. 1A in which the controller 105 is configured to perform soft-switching, the inductance of the inductor may be reduced compared with a conventional buck converter because a higher current ripple is required to support soft-switching. A conventional buck regulator operates with the current through the inductor varying by only +/−10% compared with the current at the load 110. When soft-switching is used, $I_{L1}$ typically varies from about 0 to 2 times the current at the load 110. In one embodiment, L1 is a 0.14 μH inductor and Cx is a 200 nF capacitor. Because the energy stored in an inductor is equal to $LI^2$, the smaller inductor L1 used in the soft-switched modified buck regulator can handle 2.7× as much current as a larger inductor. Therefore, L1 can handle the increased peak current of $I_{L1}$ that is needed when the switching mechanisms M1 and M2 are operated using soft-switching. L1 can also be wound with a lower on-resistance compared with the larger inductor, so conduction losses are reduced. Switching losses of the modified buck regulator can be further reduced, at the expense of slightly higher conduction losses, by increasing Cx.

For a given ripple voltage at $V_L$, the output capacitor C1 should be 8× larger for the modified buck regulator that operates using soft-switching compared with a buck regulator that operates using hard-switching. The increase in C1 is because the ripple current is 8× larger for the soft-switched modified buck regulator. When the modified buck regulator is operated at a higher frequency, C1 does not need to be 8× larger. Because switching losses are almost entirely eliminated when soft-switching is used, the modified buck regulator can be operated at much higher frequencies with little adverse affect. Therefore, C1 may be reduced proportionally from the 8× size as the operating frequency increases.

When the current demand at the load 110 changes (i.e., not steady-state operation), the switching mechanisms M1 and M2 may be controlled to quickly respond to the change in current demand by increasing or decreasing the amount of the current $I_{L1}$ this is provided to L1. When a multi-phase switching regulator is implemented, where each modified buck regulator corresponds to one of the phases, one or more phases may be enabled or disabled as the load 110 changes.

Figure 1B:
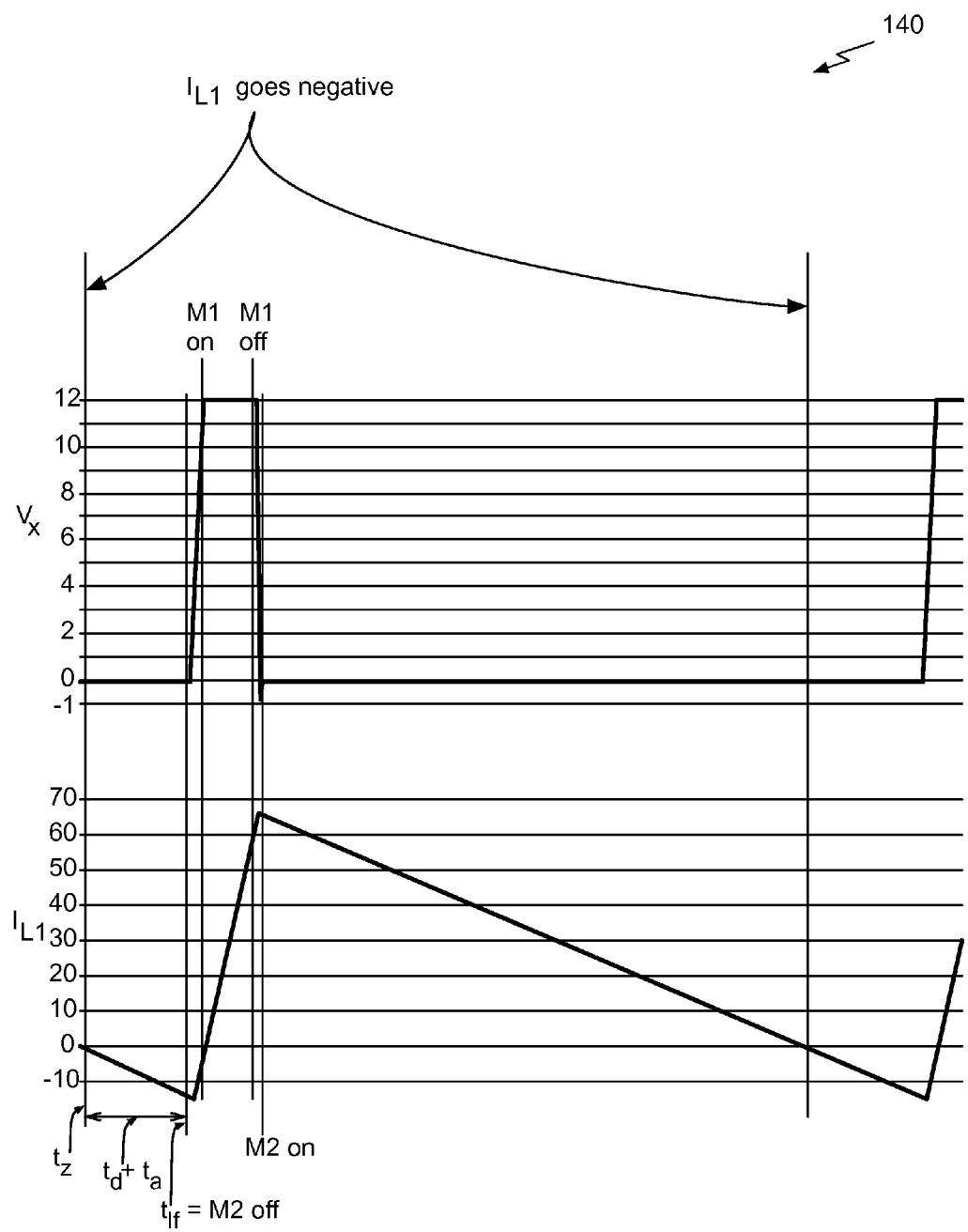
FIG. 1B illustrates voltage and current waveforms showing soft-switching of the buck regulator shown in FIG. 1A, in accordance with one embodiment.
Figure 1C:
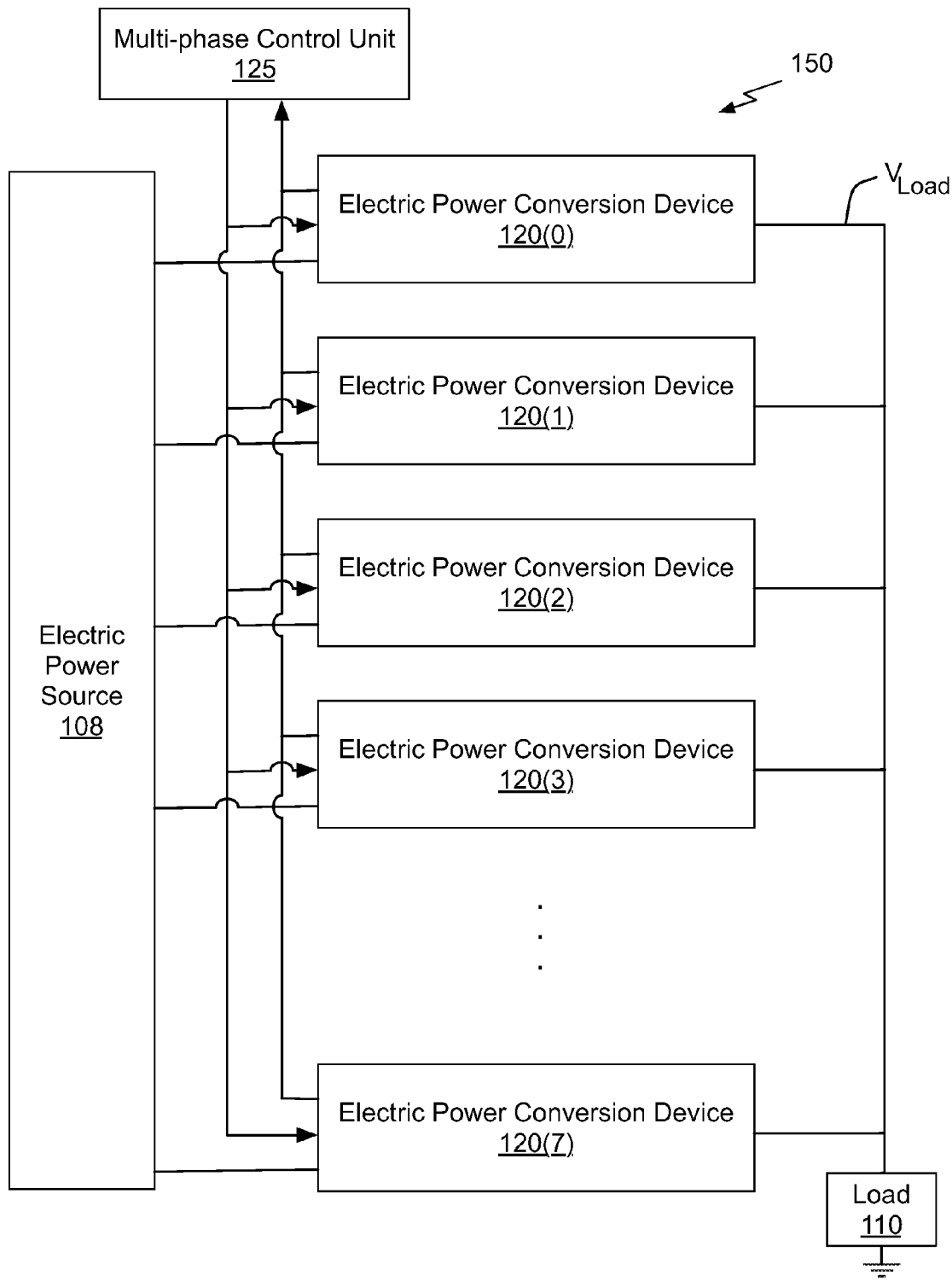
FIG. 1C illustrates a multi-phase switching regulator that includes multiple electric power conversion devices, in accordance with one embodiment.

FIG. 1B illustrates voltage and current waveforms 140 showing soft-switching operation of the modified buck regulator shown in FIG. 1A, in accordance with one embodiment. The switching losses may be reduced by more than an order of magnitude when soft-switching is used compared with using hard-switching. However, a peak current seen by the switching mechanisms M1 and M2 and L1 is higher for the modified buck regulator when soft-switching is used, resulting in a higher conduction loss. For example, a peak current for a hard-switched conventional buck regulator that does not include capacitor Cx may be 35 Amps compared with the peak current of over 65 Amps shown in the current waveform for the modified buck regulator. The conduction loss is proportional to the root-mean-squared inductor current which is 38 Amps (verses the average current of 30 Amps) for the soft-switched modified buck regulator, compared to just over 30 A for a hard-switched conventional buck regulator. Thus, the conduction loss for the soft-switched modified buck regulator may increase by 27% in exchange for a more than 10× reduction in switching loss.

As shown in FIG. 1B, there are four switching events each operating cycle (e.g., M2 off, M1 on, M1 off, M2 on). First, the switching mechanism M2 turns off when the current $I_{L1}$ in L1 has reached a level that is sufficient to charge Cx to $V_{in}$. In other words, when $I_{L1}^2 L1 = C_x V_{in}^2$. The capacitor Cx holds the voltage $V_x$ near ground while the switching mechanism M2 is turned off, so that the turn-off occurs in a ZVS mode. $V_x$ starts to rise after the switching mechanism M2 is turned off. In one embodiment, the controller 105 is configured to compute a target time $t_{tf}$ when the switching mechanism M2 is turned off by sensing when $V_x$ becomes positive—indicating that $I_{L1}$ has changed the direction of flow through L1, and is negative. The time at which $V_x$ becomes positive or $I_{L1}$ begins to flow through the switching mechanism M2 to ground is $t_z$. The controller 105 computes $t_{tf}$ by adding a computed delay $t_d$ to $t_z$ to allow the negative $I_{L1}$ to build to a value sufficient to charge Cx to $V_{in}$.

After the switching mechanism M2 turns off, $I_{L1}$ flows back into L1 and drives $V_x$ up to $V_{in}$. When $V_x$ is within a threshold of $V_{in}$, the switching mechanism M1 turns on in a ZVS mode. The turn-on of switching mechanism M1 occurs in a nearly ZCS mode as well, since $I_{L1}$ is near zero at this point. The switching mechanism M1 remains on for a period of time determined by the controller 105 so that a desired peak current is generated in L1. After the period of time, the switching mechanism M1 turns off. Because capacitor Cx holds the $V_x$ near $V_{in}$ during the turn-off of the switching mechanism M1, the turn-off occurs in a ZVS mode. After the switching mechanism M1 turns off, $I_{L1}$ discharges Cx and when $V_x$ is within a threshold of ground, the switching mechanism M2 turns on in a ZVS mode, ending the undershoot of $V_x$ after $V_x$ falls.

$I_{L1}$ is used to swing $V_x$ between $V_{in}$ and ground to achieve ZVS turn-on for each switching mechanism M1 and M2. However, timing of the turn-on events for the switching mechanisms M1 and M2 is non-critical. If either turn-on event is delayed by a small amount, the body diode of the switching mechanisms M1 and M2 that is being turned on will be forward biased for a short period of time, resulting in a very small conduction loss due to the voltage drop across the diode.

However, timing of the turn-off events for the switching mechanisms M1 and M2 is critical. If the switching mechanism M2 turns off too early there may not be sufficient energy in L1 to pull the $V_x$ to $V_{in}$ and the turn-on of the switching mechanism M1 will not occur in a ZVS mode, causing a switching loss. If the turn-off of the switching mechanism M2 is too late, more current $I_{L1}$ than is required will be in L1, leading to increased conduction losses. The controller 105 is configured to determine the turn-on and turn-off events for the switching mechanisms M1 and M2. In particular, the controller 105 senses $V_x$ and computes the target time $t_{tf}$ when the switching mechanism M2 should be turned off (i.e., disabled). In one embodiment, the controller 105 senses when the current $I_{L1}$ changes direction of flow through the switching mechanism M2 to compute the target time $t_{tf}$ when the switching mechanism M2 should be turned off.

FIG. 1C illustrates a multi-phase switching regulator 150 that includes a multi-phase control unit 125 and electric power conversion devices 120, in accordance with one embodiment. Each of the electric power conversion devices 120 is one phase of an eight-phase switching regulator. In one embodiment, each electric power conversion device 120 is configured to provide a desired output voltage level ($V_L$) at the load 110 by converting power received from an electric power source 108 for one phase of the eight phases. A single controller, shown as the multi-phase control unit 125, may be used to control each of the electric power conversion devices 120. The multi-phase control unit 125 is configured to receive information from the dedicated controller 105 within each electric power conversion device 120 and to configure each controller 105 to generate the total current that is provided to the load 110. In another embodiment, the functionality of the dedicated controllers 105 is incorporated into the central controller 125.

A single filter capacitor C1, or parallel combination of filter capacitors, may be shared by the different electric power conversion devices 120 rather than including a filter capacitor C1 in each of the electric power conversion devices 120. Additionally, one or more of the electric power conversion devices 120 may be replaced with a conventional electric power conversion device.

At any point in time, the multi-phase control unit 125 has a target upstream current $I_{TU}$ that needs to be delivered to the load 110. The different phases (i.e., electric power conversion devices 120) of the multi-phase switching regulator 150 are configured to generate a total current that approximates $I_{TU}$. One or more of the current control mechanisms within each phase is configured to generate at least a portion of the current $I_{TU}$ so that the combined draw current of the activated phases ($I_U$) approximates the current $I_{TU}$.

For example, when $I_{TU}$=100 Amps and each phase can be configured to generate $I_{L1}$=25 Amps, 4 different phases are activated. Specifically, the current control mechanisms within the electric power conversion devices 120(0), 120(1), 120(2), and 120(3) are each configured to generate $I_{L1}$=25 Amps and provide the 25 Amps to the load 110. The remaining electric power conversion devices 120(4) through 120(7) may be deactivated by the multi-phase control unit 125.

The efficiency of current generation for the electric power conversion devices 120 varies depending on the different amount of current $I_P$ that is generated. Therefore, in order to deliver the target current $I_{TU}$ efficiently, the number of phases which are activated may depend on the efficiency characteristic of the phases. In the previous example, the phases may operate at a peak efficiency of 95% when $I_{L1}$=25 Amps compared with lower efficiency for the generation of less than or greater than 25 Amps.

The per-phase current $I_P$ is 1/N the total target current $I_{TU}$. When multiple phases are activated to generate $I_{TU}$, the effective ripple is reduced by a factor of N because the phases generate current $I_P$ in a staggered manner. In other words, the combined current that is generated interleaves the currents $I_P$ produced by each active phase.

Soft-Switching Buck Regulator Controller

Figure 2:
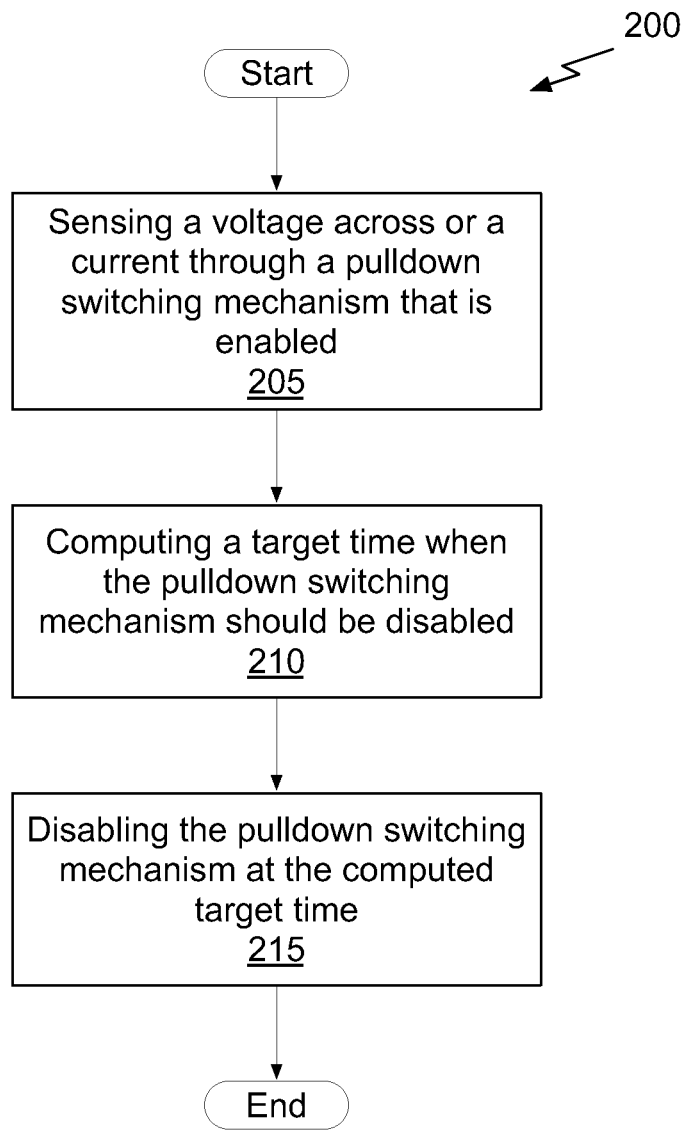
FIG. 2 illustrates a flowchart of a method for controlling a soft-switched buck regulator, in accordance with one embodiment.

FIG. 2 illustrates a flowchart 200 of a method for controlling a soft-switched buck regulator, in accordance with one embodiment. At step 205, a voltage ($V_x$) across or a current through a pull-down switching mechanism that is enabled is sensed. The pull-down switching mechanism (switching mechanism M2) is coupled to an upstream end of an inductor (L1) and in parallel with a capacitor (Cx) within a modified buck regulator circuit. At step 210, the controller 105 computes a target time when the pull-down switching mechanism will be disabled (i.e., turned off). At step 215, the pull-down switching mechanism is disabled at the computed target time. In one embodiment, the computed target time $t_{tf}$ is based on a time $t_z$ when $V_x$ crosses zero. In one embodiment, a delay $t_d$ may be added to $t_z$ to compute $t_{tf}$. When a multi-phase regulator is used, a phase adjustment delay $t_a$ may also be added to $t_z$ to compute $t_{tf}$. The phase adjustment delay $t_a$ is added to delay the time at which the pull-down switching mechanism is disabled for a phase that is advanced with respect to its ideal position as one of a set of uniformly spaced phases.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

The control of the modified buck regulator for soft-switching presents several control challenges. First, the four switch transitions must be precisely timed—preferably using just voltage sensors on the switching node and on the output node. Second, when two or more modified buck regulators are soft-switched in a multi-phase regulator, the timing of the different phases must be evenly interleaved to minimize ripple on $V_L$. Minimizing ripple while maintaining soft switching on each phase is even more difficult due to the variable frequency operation and possibly unmatched operation of each phase resulting from variations in inductance. Third, phases of a multi-phase regulator may be added and removed to maintain efficiency as the load current is varied. Fourth, a procedure is needed to start operation with only the first cycle of each phase being hard switched. At the first cycle of operation, presumably $I_{L1}$ is zero and $V_x$ is zero.

Operating multiple soft-switched modified buck regulator phases in an interleaved mode is challenging because each phase is in effect an oscillator which operates at its own natural frequency. To minimize ripple at $V_L$, the controller 105 is configured to control the switch transitions so that the different phases operate at the approximately the same frequency and maintain a fixed phase relationship between the different phases. At the same time, the controller 105 is also configured to maintain soft-switching operation to reduce switching losses and to maintain the desired output voltage $V_L$.

In one embodiment, the controller 105 is configured to control the switch transitions by using three coupled control loops. An outer voltage regulation loop regulates the output voltage $V_L$ by using feedback from $V_L$ to set a target duration $t_{hdt}$ during which the switching mechanism M1 is enabled. A frequency control loop aligns the natural frequency of the phases by measuring phase frequencies and computing adjustments to phase duration values $t_{hdai}$, $k_{hdai}$ to pull the frequencies of all phases toward a consensus value. Finally, a phase control loop adjusts the timing of each phase to evenly distribute the phases around an operating cycle and to adjust phases with offset frequencies to operate at the same frequency. The controller 105 is configured to adjust the switch transition times based one or more values provided by the outer voltage regulation loop, the frequency control loop, and the phase control loop while also maintaining soft switch operation of each phase.

Figure 3A:
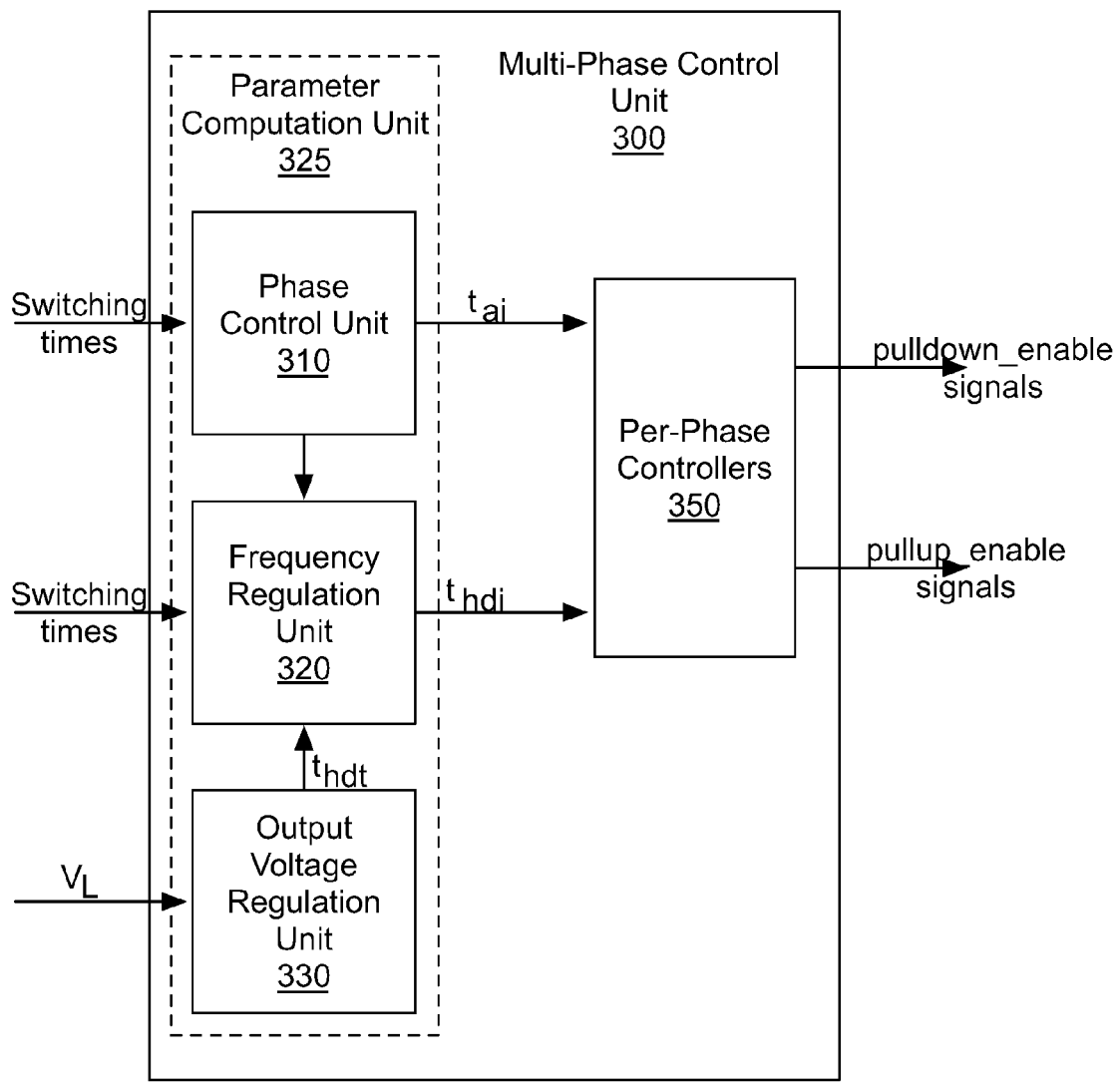
FIG. 3A illustrates a control unit for a soft-switched multi-phase buck regulator, in accordance with one embodiment.
Figure 3B:
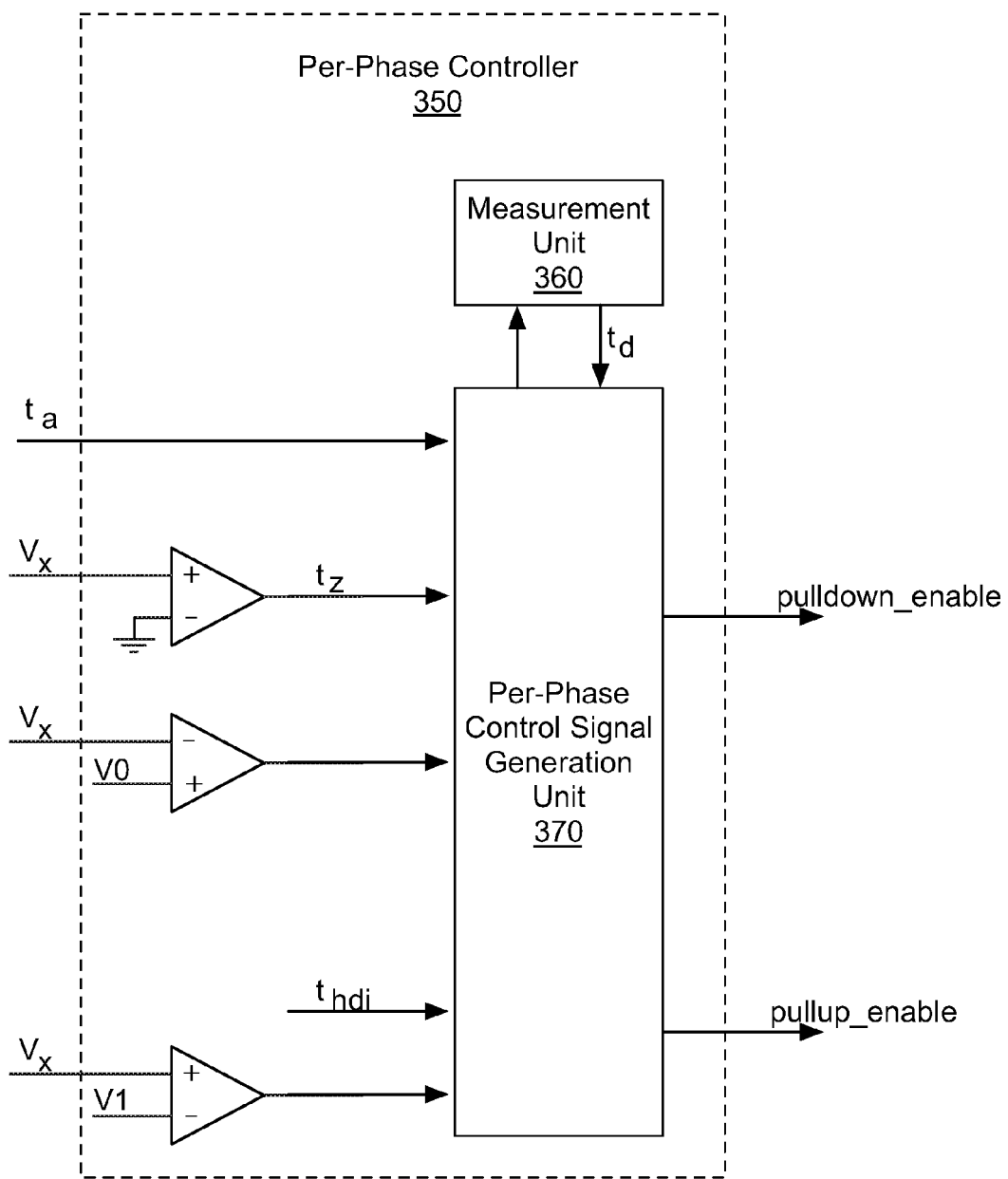
FIG. 3B illustrates a per-phase controller for a soft-switched multi-phase buck regulator, in accordance with one embodiment, in accordance with one embodiment.

FIG. 3A illustrates a multi-phase control unit 300 for a soft-switched multi-phase buck regulator, in accordance with one embodiment. Timing of the switch transitions for each phase is performed by each respective per-phase controller 350, details of which are shown in FIG. 3B, that senses $V_x$. The multi-phase control unit 300 includes a parameter computation unit 325 that includes a phase control unit 310, a frequency regulation unit 320, and an output voltage regulation unit 330. The phase control unit 310 receives the switching times at which each of the switching mechanisms M1 and M2 are enabled and disabled (i.e., turned on and off) for each of the i phases and is configured to implement the phase control loop. The frequency regulation unit 320 also receives the switching times for each of the i phases and is configured to implement the frequency control loop. The voltage regulation unit 330 senses $V_L$ and is configured to implement the outer voltage regulation loop. Each per-phase controller 350 receives the parameters computed by the parameter computation unit 325 and generates signals to enable and disable the switching mechanisms M1 and M2 for the phase. The pullup_enable signal enables and disables the pull-up switching mechanism M1 and the pulldown_enable signal enables and disables the pull-down switching mechanism M2. In one embodiment, the switching mechanism M1 is a P-type MOSFET and the pullup_enable signal is pulsed low to enable the switching mechanism M1.

The relative spacing of two phases is always adjusted by delaying the early phase to ensure that soft-switching is maintained. Adjusting a late phase to switch earlier would result in hard-switching. To delay the early phase, the phase control unit 310 is configured to set $t_a$ for the early phase to a non-zero value for one switching cycle.

With N phases numbered i=0 to i=N−1, phase 0 is designated the master phase. The time at which the switching mechanism M2 of phase 0 is disabled is designated as time 0.

$$t_{lf0}=0$$

To minimize ripple at $V_L$, a target at which the switching mechanism M2 for each phase is disabled is set as $$t_{lfti}=(i \times t_{cy})/N,$$

where $t_{cy}$ is the cycle time of the previous switching cycle.

A phase that is on time or early in terms of disabling the switching mechanism M2 is switched (disabled) at the respective target time. A phase that is late is switched later, and the time is made up by delaying the master phase on the next switching cycle. Ideally a phase reaches its zero crossing time at the computed time ($t_{zi}=t_{lfti}-t_{di}$). If so, the switching mechanism M2 for the phase is disabled at time $t_{lfti}$ and $t_{ai}=0$. If a phase is early, that is if $t_{zi}<t_{lfti}-t_{di}$, the phase is also switched at $t_{lfti}$, giving $t_{ai}=t_{lfti}-t_{di}-t_{zi}$. If the phase is late ($t_{zi}>t_{lfti}-t_{di}$) the switching mechanism M2 for the phase is disabled at $t_{lfi}=t_{zi}+t_{di}$. The amount by which the phase is early or late is recorded by the phase control unit 310 as $t_{li}=\max(0, t_{zi}+t_{di}-t_{lfti})$. A history of the amount of time by which a phase is early or late is maintained by the phase control unit 310 and used to adjust the relative on-times of phases to converge the natural cycle times of the phases. The maximum late time over all phases is used by the phase control unit 310 to set the additional delay for the master phase on the next cycle.

$$t_{a0}=\max(t_{li})$$

This in effect advances all of the phases by delaying the master phase.

To avoid increasing the negative current $I_{L1}$ in the inductor by more than a certain amount, the amount of additional time per phase may be bounded by $t_{amax}$. If a phase is early, the switching mechanism M2 for the phase is disabled at the earlier of $t_{lfti}$ and $t_{zi}+t_{di}+t_{amax}$. Similarly, the phase control unit 310 will be set $t_{a0}$ to the lessor of $\max(t_{li})$ and $t_{amax}$. Limiting the adjustment per cycle results in the alignment of the phase occurring place over several cycles with each phase taking a step in the correct direction each cycle.

The frequency regulation unit 320 is configured to adjust the time duration during which the switching mechanism M1 is enabled for individual phases to converge the natural frequencies of all of the phases. For each phase i, the frequency regulation unit 320 maintains an adjustment duration $t_{hdai}$ to a fractional accuracy (several bits to the right of the binary point). The frequency regulation unit 320 calculates the time duration of phase i by adjusting the target duration during which the switching mechanism M1 is enabled ($t_{hdt}$) by an adjustment value $t_{hdai}$ $$t_{hdi}=t_{hdt}+t_{hdai}$$

The frequency regulation unit 320 initializes the adjustment value $t_{hdai}$ for each phase to zero. However, if non-volatile memory is available, the frequency regulation unit 320 can initialize the adjustment value to a value set during testing or during the last operating session (prior to a power-off event). The frequency regulation unit 320 is configured to periodically (every few switching cycles) increment or decrement the adjustment value by an adjustment time $t_{ha}$ (a fraction of a clock cycle) depending on the history of whether the phase is early or late. The frequency regulation unit 320 receives the early and late history for each phase from the phase control unit 310. If the phase is early, the natural frequency of the phase is higher than the consensus frequency and the phase is slowed by increasing the adjustment value for the phase. If the phase is late, the phase has a frequency that is lower than the consensus frequency, and the phase is accelerated by decreasing the adjustment value for the phase. The frequency regulation unit 320 may be configured to update the adjustment values by simply incrementing or decrementing by $t_{ha}$, by using a proportional-integral-derivative (PID) controller, or by using any other well-known control algorithm.

The number of switching cycles between adjustments may be specified to balance noise immunity with responsiveness. The frequency regulation unit 320 should be configured so that enough cycles are recorded before the adjustment value is updated so that the early and late phase histories are noise free, but the minimum number of cycles is used so that the phase frequencies are balanced quickly. After the phases are adjusted according to the adjustment values, the target duration during which the switching mechanism M1 is enabled ($t_{hdt}$) and the adjustment values are updated to center the adjustments, i.e., to make the average of the adjustment values zero across all of the phases.

In an alternate embodiment, the adjustment value may be a multiplicative factor $k_{hdai}$ that is multiplied by the nominal pulse width during which the switching mechanism M1 is enabled, giving:

$$t_{hdi} = t_{hdt} \times k_{hdai}$$

In some cases, frequency regulation unit 320 may be configured to adjust the duration during which the switching mechanism M1 is enabled using both additive and multiplicative factors $$t_{hdi} = t_{hdt} \times k_{hdai} + t_{hdai}$$

The frequency regulation unit 320 initializes the multiplicative factor to 1 and adjusts the multiplicative factor by small amounts based on the early and late history of the phase.

In addition to the adjustment values $t_{hdai}$ or $k_{hdai}$ which account for static or long-term mismatch between phases, the frequency regulation unit 320 may be configured to add an addition adjustment to the pulse width during which the switching mechanism M1 is enabled to account for excess inductor current $I_{L1}$ on a particular cycle. If the time at which the switching mechanism M2 is disabled is delayed by $t_{ai}$ for a phase, then the time during which the switching mechanism M1 is disabled should be delayed by a scaled fraction of $t_{ai}$ (e.g., $k_h t_{ai}$) to compensate for the time required to cancel the excess negative inductor current $I_{L1}$. In this case, the time during which the switching mechanism M1 is disabled becomes $$t_{hdi} = t_{hdt} + t_{hdai} + k_h t_{ai}$$

where $k_h$ is $V_L/V_{in}$ or nominally about 1/12 (e.g., 0.083).

The output voltage regulation unit 330 is configured to use feedback control to set the nominal time during which the switching mechanism M1 is enabled, $t_{hdt}$ based on an error signal derived by comparing the output voltage $V_L$ to a desired reference voltage Vr. The output voltage regulation unit 330 may be configured to compute the error signal as:

$$Ve = Vr - V_L$$

The output voltage regulation unit 330 may set $t_{hdt}$ based on Ve using a control law. For example, a proportional plus integral (PI) control law may be used:

$$t_{hdt} = k_p Ve + k_i \int Ve dt$$

Alternatively a time-optimal control law may be used by the output voltage regulation unit 330 to set the time during which the switching mechanism M1 is enabled.

The width of the pulse used to enable the switching mechanism M1 determines the current $I_{L1}$ that is produced during each phase, so the transfer function from the pulse to the output is $$\frac{V_L(s)}{t_{hdt}(s)} = k\left(R + \frac{1}{Cs}\right)$$

where R is the equivalent series resistance (ESR) of the filter capacitor C1, Cs is the value of the filter capacitor, and k is the gain from the pulse width to current $I_{L1}$ (in A/s). The control parameters $k_p$ and $k_i$ are chosen to give a fast response while maintaining adequate phase margin for stability. An integral term is needed to eliminate residual error.

In one embodiment, the output voltage regulation unit 330 is configured to sense Ve by using an analog-to-digital converter (ADC) having a precision of at least 10 bits (1 mV resolution) and that operates at 1 MHz to convert $V_L$ to digital form. The ADC closes a control loop around the resonant circuit formed by L1 and C1. With this approach Ve is computed in the digital domain and the control law is implemented entirely digitally to compute $t_{hdt}$.

In another embodiment, the boundary between analog and digital processing is shifted to a different point in computation. For example, $V_L$ is subtracted from Vr to generate Ve in the analog domain and then Ve is converted to a digital value using an ADC. Alternatively, the control law can be implemented in the analog domain using an OpAmp with appropriate input and feedback networks generating an analog representation of $t_{hdt}$, which is then converted to a digital value by an ADC.

FIG. 3B illustrates a per-phase controller 350 for a soft-switched multi-phase buck regulator, in accordance with one embodiment. The per-phase controller 350 is configured to generate enable/disable signals to control the switching mechanisms M1 and M2. The switching device M1 is configured as a pull-up mechanism that is controlled by the pullup_enable signal. The switching device M2 is configured as a pull-down mechanism that is controlled by the pulldown_enable signal.

The per-phase controller 350 is configured to generate the pullup_enable signal based on $t_{hdi}$ and sensing that one of two conditions is met. A first condition is that Cx has been charged to a high threshold voltage V1 that is close to $V_{in}$. A second condition is that the derivative of $V_x$ has gone negative, indicating the $V_x$ has passed its peak value without reaching V1. The pullup_enable signal enables the pull-up switching mechanism when either the first or the second condition is met. The pull-up switching mechanism is enabled for the duration specified by $t_{hdi}$, and then the pullup_enable signal disables the pull-up switching mechanism. The per-phase control signal generation unit 370 records the time $t_{hmi}$, at which the pull-up switching mechanism is enabled.

The width of the pulse of the pullup_enable signal that enables the pull-up switching mechanism for phase i, $t_{hdi} = t_{hfi} - t_{hmi}$ determines the current $I_{L1}$ delivered by the phase and also the natural frequency for the phase. The phase duration, and hence the time during which the pull-up mechanism is disabled is controlled by two control loops. The output voltage regulation unit 330 that determines the target width of the pull-up enable pulse for all phases $t_{hdt}$ and the frequency regulation unit 320 determines the duration of pull-up enable pulse of each phase $t_{hdi}$.

The per-phase controller 350 includes a comparator that compares $V_x$ and V1 to identify when Cx is charged to the high threshold value V1. A measurement unit 360 is configured to detect the second condition. When the second condition occurs, the per-phase controller 350 increases the delay $t_{di}$ for the phase to increase the amount of reverse inductor current $I_{L1}$ that is needed to charge Cx to $V_{in}$. Ideally, the amount of current provided to Cx does not exceed what is needed to charge Cx to $V_{in}$. Adaptively computing the delay time for each phase ($t_{di}$), to provide just the amount of reverse inductor current $I_{L1}$ that is needed to charge Cx to $V_{in}$ minimizes conduction losses. Computing $t_{di}$ in this manner also compensates for any offset in sensing the zero crossing of each phase.

The measurement unit 360 may also be configured to periodically (about once each 10 ms) perform a measurement procedure to adjust $t_{di}$. For example, during the measurement procedure, the measurement unit 360 may reduce $t_{di}$ by one clock cycle each switching cycle until the sensed current $I_{L1}$ is too small. During the measurement procedure, the measurement unit 360 senses $I_{L1}$ for each switching cycle to determine when the derivative of Vx becomes negative before the time when the switching mechanism M1 is enabled is reached. During the measurement procedure, the per-phase control signal generation unit 370 forces $t_{ai}$ to be zero—to avoid distorting the measurement. Once the measurement unit 360 determines the critical value of $t_{di}$, the measurement unit 360 adds a guard band (nominally 30 ns) to provide some margin until the next adaptation cycle. If, between measurement procedures, sensing of $I_{L1}$ indicates that $V_x$ is not fully charged, the measurement unit 360 immediately increments $t_{di}$ by one step without waiting for the next measurement procedure.

In one embodiment, the measurement unit 360 is implemented using a differentiator—an op-amp with resistive feedback and a capacitively coupled input. The differentiator should be tuned so that it has adequate gain at the resonant frequency of Cx and L1 but rolls off above that frequency to reject noise. The differentiator should be followed by a comparator to detect when the derivative reaches a particular threshold, such as 0 or a small negative value.

In one embodiment, the pullup_enable signal may be computed in the analog domain by comparing an analog version of $t_{hdt}$ to a ramp signal generated for each phase. The pull-up switching mechanism is enabled by resetting the ramp generator. The pull-up switching mechanism is disabled when the ramp reaches $t_{hdt}$. The slope of the ramp for each phase i may be adjusted to set $k_{hdai}$ and the start point of the ramp is adjusted to set $t_{hdai}$ for use by the frequency regulation unit 320.

The per-phase control signal generation unit 370 is configured to generate the pulldown_enable signal to enable the pull-down switching mechanism based on $V_x$ and a low threshold voltage V0. Each cycle of each phase starts with the pulldown_enable signal disabling the pull-down switching mechanism. The per-phase control signal generation unit 370 is configured to disable the pull-down switching mechanism based on $t_z$, $t_d$, and $t_a$. As previously explained, the delay $t_a$ may be added to the delay $t_d$ to adjust the spacing of phases. Therefore, the switching mechanism M2 for each phase is disabled at $t_{lfi} = t_{zi} + t_{di} + t_{ai}$. The times $t_z$, $t_d$, $t_a$, etc. are nominally represented in units of clock cycles at which the per-phase controllers 350 operate (e.g., each unit is a 10 ns period).

After the pull-down switching mechanism is disabled, the pull-up switching mechanism is enabled and then disabled by the pullup_enable signal. After the pull-up switching mechanism is disabled, the current $I_{L1}$ discharges Cx, and when $V_x$ drops below the low threshold voltage V0, the pull-down switching mechanism is enabled by the pulldown_enable signal. The per-phase controller 350 includes a comparator that compares $V_x$ and V0 to identify when $V_x$ drops below the low threshold voltage V0.

Three comparators with separate reference voltages (e.g., V0, V1, and ground) may be used, as shown in FIG. 3B, or one comparator may be used with an analog multiplexer to select the reference voltage. The reference voltages may be set by a digital-to-analog converter (DAC) so the reference voltages can be trimmed to account for variations in power, voltage and temperature. The reference voltage V1 should be proportional to $V_{in}$, so that V1 tracks variations in $V_{in}$. In one embodiment, the per-phase control signal generation unit 370 is configured to tune the values of V1 and V0 by stepping V0 and V1 away from their respective supply voltages and observing the output of the differentiator ($dV_x/dt$) as the switching mechanisms are enabled and disabled. If the switching mechanisms are operating in a ZVS mode, $dV_x/dt$ should be near zero and positive when the pull-up switching mechanism turns on and near zero and negative when the pull-down switching mechanism turns on.

Figure 4:
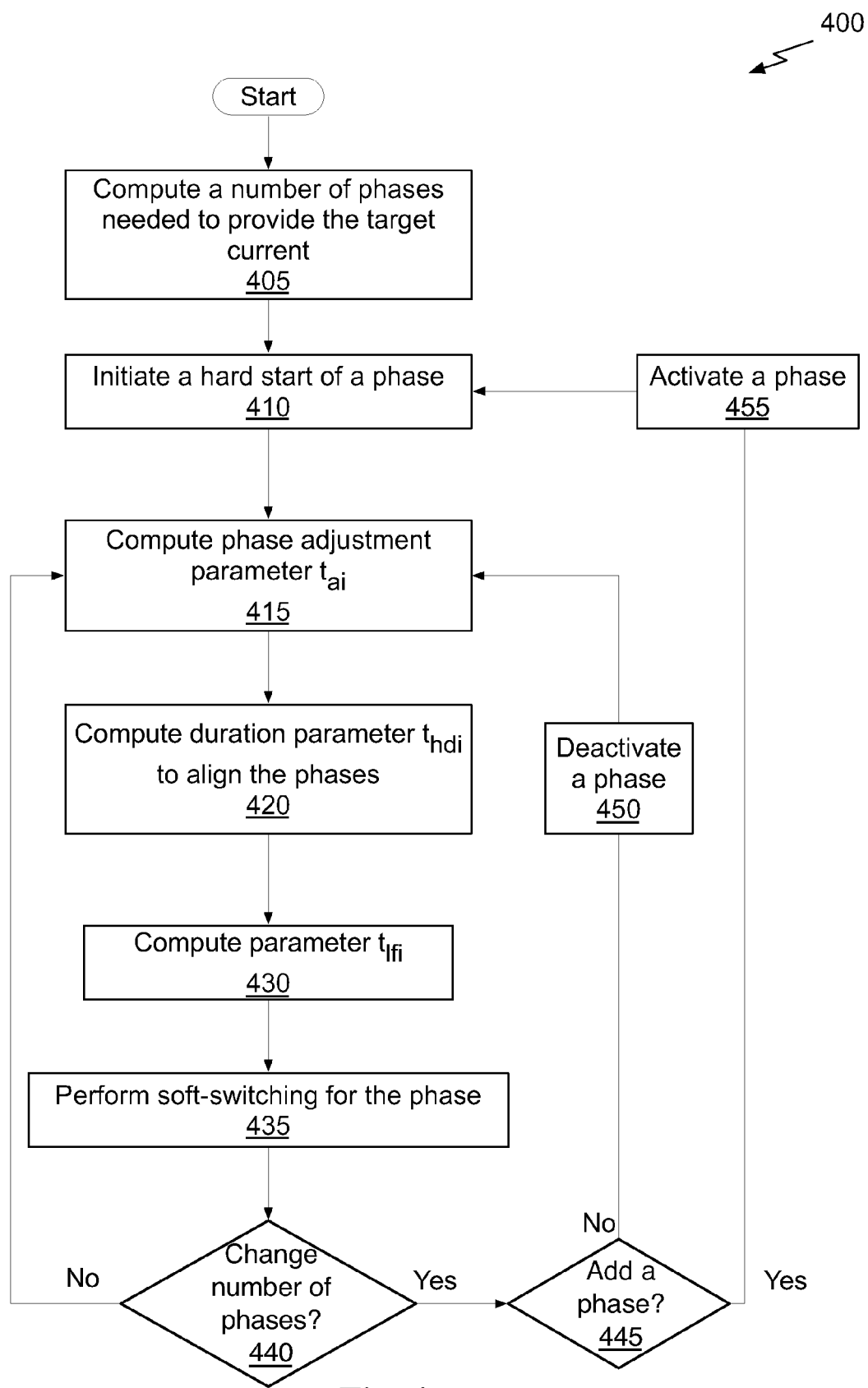
FIG. 4 illustrates a flowchart of a method for controlling a soft-switched multi-phase buck regulator, in accordance with one embodiment.

FIG. 4 illustrates a flowchart of a method 400 for controlling a soft-switched multi-phase regulator, in accordance with one embodiment. Each phase of the soft-switched multi-phase regulator may be a modified buck regulator. At operation 405, the multi-phase control unit 300 determines the number of phases that are needed to provide current to the load 110. The multi-phase control unit 300 may be configured to maintain an efficiency curve and adjust the number of phases that are activated so that each phase is operating at approximately maximum efficiency.

At operation 410, the multi-phase control unit 300 initiates a hard start of a phase to activate the phase. With a 600 μF capacitor and a 30 Amp phase, 20 μs are required to charge $V_L$ to its steady state value with a single phase. Load current should be inhibited during startup. One would expect that the multi-phase control unit 300 would first enable the pull-up switching mechanism and start the phase using hard-switching. Unfortunately, when hard-switching is used, significant energy is dissipated to charge Cx through the pull-up switching mechanism. A preferable approach is to reduce phase switching energy by starting the phase by enabling the pull-down switching mechanism for a predetermined amount of time to build current in the inductor L1 and then disabling the pull-down switching mechanism to allow L1 to charge Cx.

While neither technique of starting a phase is strictly ZVS, starting a phase by enabling the pull-down switching mechanism first requires much less switching energy compared with starting the phase by enabling the pull-up switching mechanism first. The pull-down switching mechanism only needs to discharge Cx by about 1 Volt whereas the pull-up switching mechanism needs to charge Cx through 11 Volts (assuming $V_{in}$ is 12V). Energy is proportional to the square of the voltage, so it takes less than 1% of the energy to start the phase by enabling the pull-down switching mechanism first compared with enabling the pull-up mechanism first. Such a technique is referred to as nearly soft-switching because while it is not ZVS, it does save 99% of the energy of that would be consumed for hard-switching. Thus, the hard start that is initiated by the multi-phase control unit 300 at operation 410 performs nearly soft-switching by generating a pulse to enable the pull-down switching mechanism for a predetermined amount of time to build current in the inductor L1 and to allow L1 to charge Cx. Once the hard start is performed at operation 410, the remaining transitions for the phase will be soft-switched.

At operation 415, the multi-phase control unit 300 computes the phase adjustment parameter $t_{ai}$ for each phase i that is activated. At operation 420, multi-phase control unit 300 computes the duration of a pulse that activates the pull-up switching mechanism, $t_{hdi}$, to align the phases. The duration of the pulse may be computed based on a target pulse width $t_{hdt}$ and phase duration adjustment values $t_{hdai}$, $k_{hdai}$. The target pulse width is computed based on $V_L$. At operation 430, the multi-phase control unit 300 computes the parameter $t_{lfi}$ that disables the pull-down switching mechanism for each phase i that is activated. The parameter $t_{lfi}$ is computed based on a time $t_{zi}$ when $V_x$ crosses zero for phase i. A delay $t_{di}$ may be added to $t_{zi}$ to compute $t_{lfi}$. The phase adjustment parameter $t_{ai}$ may also be added to $t_{zi}$ to compute $t_{lfi}$.

At operation 435, the per-phase control signal generation unit 370 for each activated phase is configured to perform soft-switching control for the respective phase. Although operations 415, 420, 430, and 435 are shown in FIG. 4 as a sequence of operations, one or more of the operations 415, 420, 430, and 425 may be performed in parallel.

At operation 440, the multi-phase control unit 300 determines if the number of phases that is activated should be changed. If, the number of phases that are activated does not need to be changed, then the multi-phase control unit 300 returns to operation 415 for the next operating cycle. As previously explained, the multi-phase control unit 300 may be configured to maintain an efficiency curve and adjust the number of phases that are activated so that each phase is operating at approximately maximum efficiency. In particular, the multi-phase control unit 300 may be configured to activate or deactivate a phase when overall efficiency would be improved by the change. Some hysteresis may be applied to the decision to enable/disable phases to avoid oscillating between numbers of phases. Specifically, if N phases are operating and the total current is I, the multi-phase control unit 300 may be configured to compare Eff(I/N) with Eff(I/(N+1)) and Eff(I/(N−1)) and activate or deactivate a phase when the efficiency gain to do so exceeds a small threshold.

If, at operation 440, the multi-phase control unit 300 determines that the number of phases that are activated should be changed, then at operation 445, the multi-phase control unit 300 determines if a phase should be activated. If a phase should not be activated, then at operation 450, the multi-phase control unit 300 deactivates a phase before returning to operation 415.

In one embodiment, to deactivate a phase when N phases are operating, the highest numbered phase is deactivated by turning off the pull-down switching mechanism as soon as the zero crossing of $V_x$ is detected by the per-phase control signal generation unit 370 (i.e., at $t_z$). Therefore, no additional delay is incurred to build negative current $I_{L1}$ in the inductor. The phases that remain activated will then compute updated parameters to provide the current to the load 110. The ideal time when a phase should be deactivated can be trimmed to result in zero inductor current by observing the $V_x$ immediately after the phase is deactivated. If the derivative $dV_x/dt$ is negative, the phase was deactivated too soon. If the derivative is positive, the phase was deactivated too late. The multi-phase control unit 300 may be configured to adjust a phase deactivation delay $t_{sdi}$ when each phase is deactivated so that over time the inductor current for each phase deactivation converges to zero inductor current.

On the operating cycle following deactivation of the phase, the duration of the pulse that enables the pull-up switching mechanism is adjusted to increase the current generated in the phases that remain activated. The multi-phase control unit 300 may be configured to make an adjustment so that $$t_{hdt} = t'_{hdt} \times k_n$$

where $t'_{hdt}$ is the nominal duration if one phase were carrying all of the current and $$k_n = 1/N$$

is the reduction to distribute this current over N phases.

When a phase is activated or deactivated, the current per phase is adjusted by N/(N+1) or (N+1)/N and the frequency of each phase is adjusted by a similar amount. To quickly converge the spacing of the activated phases, the value of $t_{cy}$ is multiplied by N/(N+1) when activating a phase (starting with N phases) and multiplied by N/(N−1) when deactivating a phase (starting with N phases). Adjusting the value of $t_{cy}$ in this manner avoids waiting one full operating cycle of the master phase to determine the new value for $t_{cy}$.

If, at operation 445, the multi-phase control unit 300 determines that a phase should be activated, then at operation 455, the multi-phase control unit 300 activates a phase and proceeds to operation 410. To activate a phase, the multi-phase control unit 300 activates the next phase on the next operating cycle. As with phase deactivation, when a phase is activated, the other phases will automatically redistribute themselves so that the activated phases are evenly spaced within an operating cycle.

In an alternative embodiment, the multi-phase control unit 300 may be configured to activate and deactivate phases gradually. A phase may be deactivated gradually by reducing $t_{hd}$ in a linear slope over a number of operating cycles. Similarly a phase may be activated gradually by increasing $t_{hd}$ in a linear slope. Gradual activation and deactivation of phases has the advantage that feed-forward adjustments of $t_{hd}$ and frequency at which the pull-up switching mechanism is enabled are not required since the change is slow enough that the other phases can adapt to it. This approach, however, has the problem that the phase being gradually activated will have a much higher natural frequency than the other phases, leading to adding a lot of additional time to each operating cycle and high negative $I_{L1}$. For this reason, abrupt switching of phases with feed-forward adjustment of $t_{hd}$ and cycle time is preferred.

In cases of extreme current emergencies (i.e., high current demand at the load 110), multiple phases may be activated simultaneously. In the other extreme, if the current demand falls below a certain level very high-frequency operation will result. At the point where losses due to this high-frequency operation exceed losses due to hard-switching, the multi-phase control unit 300 may be configured to switch to a hard-switched pulse-frequency modulation mode of operation to control the switching mechanisms.

Figure 5:
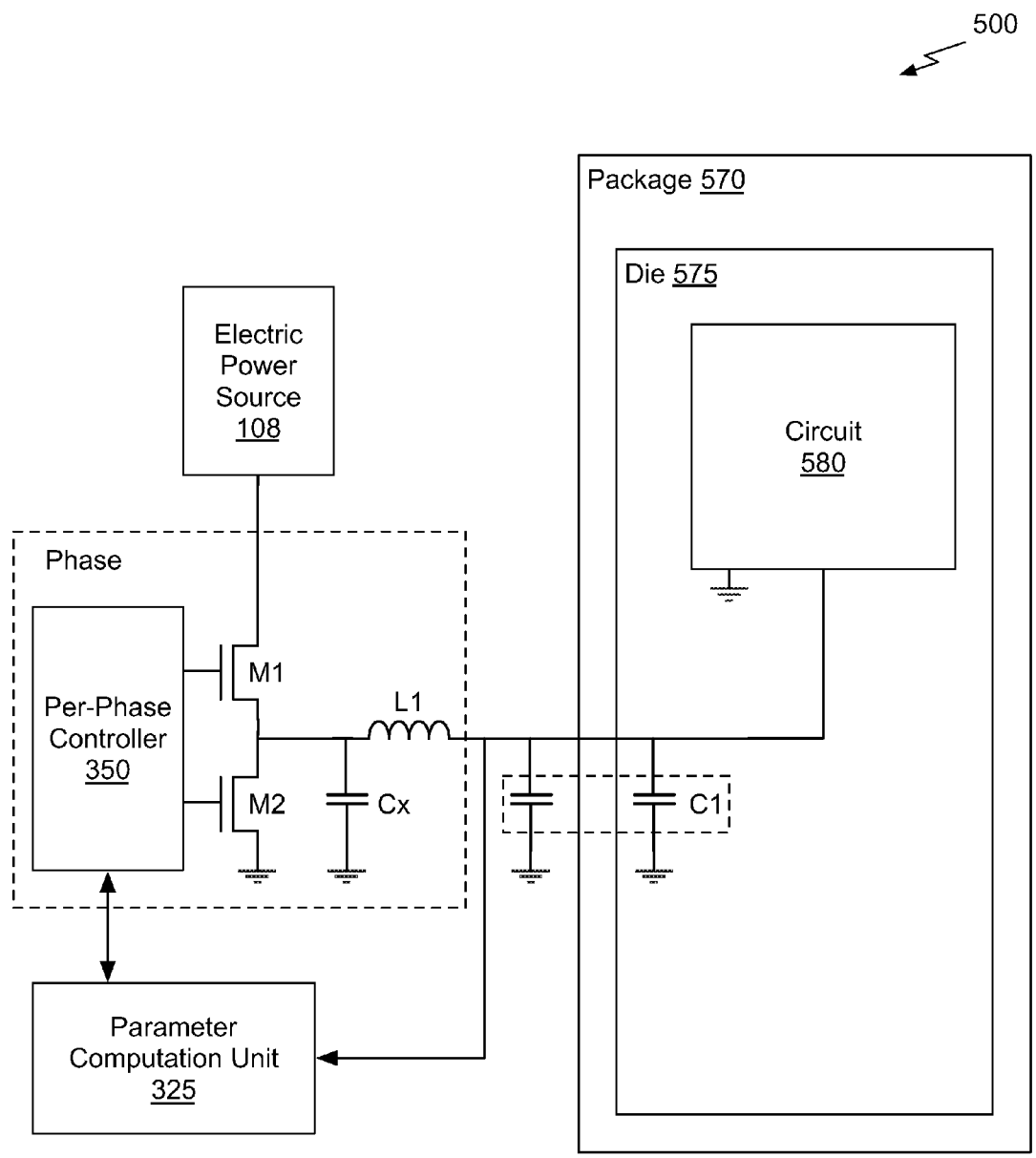
FIG. 5 illustrates a diagram of the multi-phase soft-switched buck regulator within a system, according to one embodiment.

FIG. 5 illustrates a system 500 including a multi-phase soft-switched modified buck regulator, according to one embodiment. The switching regulator in the system 500 includes the multi-phase control unit 300, i.e., a single parameter computation unit 325 and a per-phase controller 350 for each phase. A single modified buck regulator and per-phase controller 350 is shown in FIG. 5 to represent the circuitry for each phase of the multi-phase soft-switched modified buck regulator. In one embodiment, a combination one or more modified buck regulators may be used with one or more conventional electric power conversion devices to provide power to the circuit 580.

The electric power source 108 is coupled to each phase. The inductor L1 within each phase is coupled to the filter capacitor C1. The filter capacitor C1 may be implemented as a parallel combination of filter capacitors where a large capacitor is used outside of the package 570 (i.e., on a printed circuit board) and a smaller capacitor is used within the package 570 or on the die 575. The N per-phase controllers 350 that are active are configured to generate a current through the respective inductors L1 to regulate the voltage level at the load, i.e., circuit 580. In one embodiment, the respective per-phase controllers 350 are each configured by the per-phase controller 350 and the parameter computation unit 325 to maintain the voltage level at the circuit 580 within a predetermined range bounded by respective Vmin and Vmax values.

Figure 6:
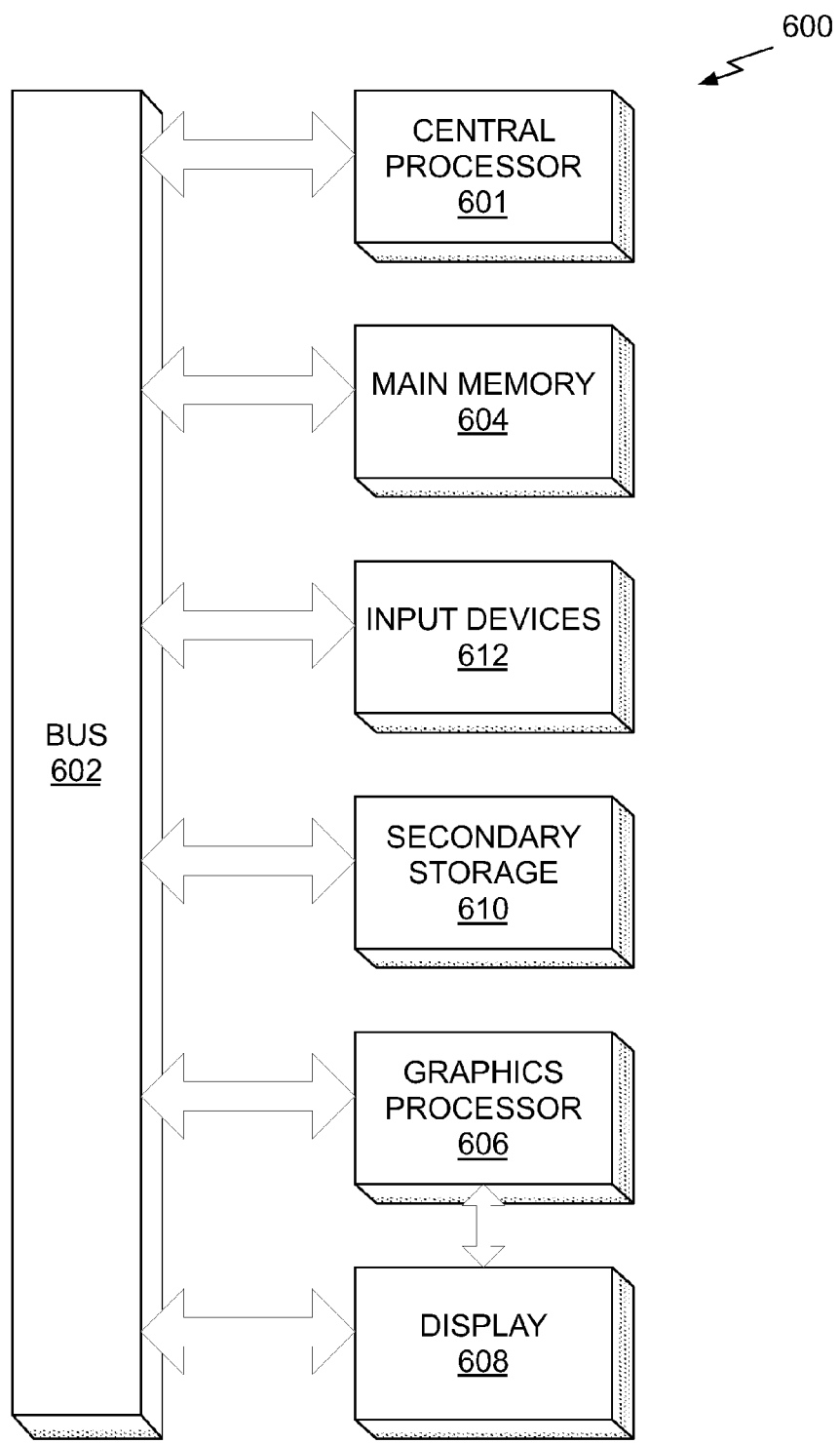
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 600 to provide power to one or more of the chips.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
sensing a voltage ($V_x$) across a pull-down switching mechanism within a modified buck regulator circuit or a current through the pull-down switching mechanism when the pull-down switching mechanism is enabled, wherein the pull-down switching mechanism is coupled to an upstream end of an inductor and the pull-down switching mechanism is coupled in parallel with a capacitor;
computing a target time when the pull-down switching mechanism will be disabled ($t_{lf}$) as a sum of a time ($t_z$) when the voltage ($V_x$) reaches zero volts, a delay ($t_d$) and a phase adjustment delay ($t_a$); and
disabling the pull-down switching mechanism at the target time.

2. The method of claim 1, further comprising performing a measurement procedure to adjust the delay ($t_d$).

3. The method of claim 2, wherein the measurement procedure comprises:
reducing the delay ($t_d$) each switching cycle; and
sensing when a derivative of the voltage ($V_x$) becomes negative before a time when a pull-up switching mechanism is enabled to identify a critical reduced value of the delay ($t_d$).

4. The method of claim 3, further comprising computing the delay ($t_d$) by adding a guard band to the critical reduced value of the delay ($t_d$).

5. The method of claim 1, further comprising increasing the delay ($t_d$) when the voltage ($V_x$) does not reach a high threshold voltage.

6. The method of claim 1, further comprising enabling a pull-up switching mechanism that is coupled between the upstream end of the inductor and an electric power source when the voltage ($V_x$) reaches a high threshold voltage.

7. The method of claim 1, wherein a pull-up switching mechanism is enabled and disabled in a zero-voltage switching mode.

8. The method of claim 1, further comprising enabling a pull-up switching mechanism that is coupled between the upstream end of the inductor and an electric power source when a derivative of the voltage ($V_x$) goes negative.

9. The method of claim 1, further comprising generating a pulse ($t_{hd}$) to enable a pull-up switching mechanism that is coupled between the upstream end of the inductor and an electric power source, wherein a duration of the pulse ($t_{hd}$) is based on a voltage at a load that is coupled to a downstream end of the inductor.

10. The method of claim 1, wherein the pull-down switching mechanism is enabled and disabled in a zero-voltage switching mode.

11. A method, comprising:
sensing a voltage ($V_x$) across a pull-down switching mechanism within a modified buck regulator circuit or a current through the pull-down switching mechanism when the pull-down switching mechanism is enabled, wherein the pull-down switching mechanism is coupled to an upstream end of an inductor and the pull-down switching mechanism is coupled in parallel with a capacitor;
computing a target time when the pull-down switching mechanism will be disabled ($t_{tf}$);
disabling the pull-down switching mechanism at the target time;
enabling the pull-down switching mechanism when the voltage ($V_x$) reaches a low threshold voltage; and
tuning the low threshold voltage by increasing the low threshold voltage and observing a derivative ($dV_x/dt$) as the pull-down switching mechanism is enabled.

12. The method of claim 11, wherein the pull-down switching mechanism is enabled and disabled in a zero-voltage switching mode.

13. The method of claim 11, further comprising enabling a pull-up switching mechanism that is coupled between the upstream end of the inductor and an electric power source when the voltage ($V_x$) reaches a high threshold voltage.

14. The method of claim 11, wherein a pull-up switching mechanism is enabled and disabled in a zero-voltage switching mode.

15. A modified buck regulator circuit, comprising:
a pull-up switching mechanism;
a pull-down switching mechanism that is coupled to the pull-up switching mechanism;
an inductor having an upstream end that is coupled between the pull-up switching mechanism and the pull-down switching mechanism;
a capacitor that is coupled to the upstream end of the inductor and in parallel with the pull-down switching mechanism; and
a controller circuit that is coupled to the pull-up switching mechanism and the pull-down switching mechanism and configured to:
sense a voltage ($V_x$) across the pull-down switching mechanism when the pull-down switching mechanism is enabled;
compute a target time when the pull-down switching mechanism will be disabled as a sum of a time ($t_z$) when the voltage ($V_x$) reaches zero volts, a delay ($t_d$) and a phase adjustment delay ($t_a$); and
disable the pull-down switching mechanism at the target time.

16. The modified buck regulator circuit of claim 15, wherein the controller circuit is further configured to perform a measurement procedure to adjust the delay ($t_d$).

17. A modified buck regulator circuit, comprising:
a pull-up switching mechanism;
a pull-down switching mechanism that is coupled to the pull-up switching mechanism;
an inductor having an upstream end that is coupled between the pull-up switching mechanism and the pull-down switching mechanism;
a capacitor that is coupled to the upstream end of the inductor and in parallel with the pull-down switching mechanism; and
a controller circuit that is coupled to the pull-up switching mechanism and the pull-down switching mechanism and configured to:
sense a voltage ($V_x$) across the pull-down switching mechanism when the pull-down switching mechanism is enabled;
compute a target time when the pull-down switching mechanism will be disabled;
disable the pull-down switching mechanism at the target time;
enable the pull-down switching mechanism when the voltage ($V_x$) reaches a low threshold voltage; and
tune the low threshold voltage by increasing the low threshold voltage and observing a derivative ($dV_x/dt$) as the pull-down switching mechanism is enabled.

18. The modified buck regulator circuit of claim 17, wherein the pull-down switching mechanism is enabled and disabled in a zero-voltage switching mode.

19. The modified buck regulator circuit of claim 17, further comprising enabling a pull-up switching mechanism that is coupled between the upstream end of the inductor and an electric power source when the voltage ($V_x$) reaches a high threshold voltage.

20. The modified buck regulator circuit of claim 17, wherein a pull-up switching mechanism is enabled and disabled in a zero-voltage switching mode.

* * * * *